(12) United States Patent  
Robinson

(10) Patent No.: US 6,907,859 B1  
(45) Date of Patent: Jun. 21, 2005

(54) INTERNAL COMBUSTION ENGINE WITH ELEVATED EXPANSION RATIO

(76) Inventor: Barnett Joel Robinson, 227 California St., Newton, MA (US) 02458

( * ) Notice: Subject to any disclaimer, the term of this patent is extended or adjusted under 35 U.S.C. 154(b) by 0 days.

(21) Appl. No.: 10/843,824

(22) Filed: May 11, 2004

(51) Int. Cl.⁷ ............................ F02B 75/02; F02B 29/00
(52) U.S. Cl. ........................................................ 123/316
(58) Field of Search ............................................ 123/316

(56) References Cited

U.S. PATENT DOCUMENTS 3,878,826 A    4/1975 Date et al.
4,192,265 A  * 3/1980 Amano et al. ............... 123/274

* cited by examiner

Primary Examiner—Andrew M. Dolinar
Assistant Examiner—Katrina B. Harris
(74) Attorney, Agent, or Firm—David M Warren

(57) ABSTRACT

An Elevated Expansion-Ratio Internal Combustion Engine has a substantially standard repeating four-stroke sequence for each cylinder, and the Engine includes for each cylinder: an intake valve, a combustion-gas exhaust valve, and a vapor return valve. A return manifold for vapor connects from the return valves of respective ones of the cylinders back into a passage ahead of a beginning portion of an intake manifold. Substantially during a predetermined part of each compression stroke in the sequence of strokes, the return valve opens after a closing of the intake valve, and thereafter closes at a time within the compression stroke corresponding to a predetermined position of the piston in the cylinder.

10 Claims, 5 Drawing Sheets

INTERNAL COMBUSTION ENGINE WITH ELEVATED EXPANSION RATIO

BACKGROUND OF THE INVENTION

This invention relates to internal combustion engines and, more particularly, to the provision of an improved expansion cycle stroke characteristic in an internal combustion engine.

A form of the internal combustion engine, generally used for powering automobiles, operates in accordance with the Otto cycle, and may be referred to herein as a gasoline engine, as distinguished from a diesel engine. The gasoline engine employs one or more cylinders, each cylinder having a piston movable therein with reciprocating motion for the driving of a crankshaft of the engine. Output power of the engine, for the driving of a load, is obtained from the rotating crankshaft. In the four-stroke form of the gasoline engine, the movement of a piston in its cylinder is characterized by four strokes, which occur in a repeating sequence, the sequence of the four strokes being; an induction stroke, a compression stroke, a power (or expansion) stroke, and an exhaust stroke. During the induction stroke, the piston moves away from the head of the cylinder to produce a vacuum which draws in a mixture of air and fuel vapors via an intake valve generally located in the head of the cylinder. During the compression stroke, the piston moves towards the cylinder head to compress the air-fuel mixture. Approximately at the beginning of the power stroke, there is ignition of the air-fuel mixture and, during the power stroke, the expanding gases produced by the combustion of the fuel drive the piston away from the cylinder head. During the exhaust stroke, the piston moves towards the cylinder head to drive the exhaust gases out of the cylinder via an exhaust valve generally located in the cylinder head. In the usual construction of such an engine, an intake manifold is provided for bringing air and fuel from a carburetor or fuel-injection assembly to the intake ports of the cylinders, and an exhaust manifold is provided for removal of combustion gases via exhaust ports of the cylinders.

It is useful to compare operation of the gasoline engine with the diesel engine. In the case of the gasoline engine, both fuel and air are present in the cylinder during the compression stroke. The temperature produced in the gases within the cylinder is below the ignition temperature of the air-fuel mixture so as to avoid premature ignition of the air-fuel mixture. Ignition is produced by an electric spark of a spark plug, mounted within the cylinder head. In a modem engine, activation of the spark plug at an optimum moment, relative to the time of occurrence of the power stroke, is provided by a computer. In the case of the diesel engine, only the air is present in the cylinder during the compression stroke. The geometry of the piston within the cylinder of the diesel engine differs somewhat from the corresponding geometry of the gasoline engine such that the compression stroke of the diesel engine provides significantly more compression of the gases within the cylinder (a compression ratio of approximately 15:1) than occurs in the gasoline engine (a compression ratio of approximately 8:1). As a result, in the diesel engine, the temperature of the air is raised by the compression stroke to a temperature high enough to ignite fuel. Accordingly, in the diesel engine, the fuel is injected into the cylinder at approximately the beginning of the power stroke, and is ignited by the high air temperature.

It is observed furthermore, that in the usual construction of a gasoline engine and of a diesel engine, the ratio of the expansion of the volume of cylinder gases, final volume divided by initial volume of the power stroke, is equal to the ratio of the compression of the volume of the cylinder gases, initial volume divided by final volume of the compression stroke. By way of example for a gasoline engine, compression and expansion is characterized by a ratio of approximately 8:1, and for a diesel engine, compression and expansion is characterized by a ratio of approximately 15:1. The expansion of the cylinder gases in the power stroke is accompanied by a reduction in the temperature of the cylinder gases. Well-known theoretical considerations show that an important consideration in determining the efficiency of the engine is the ratio of the gas temperature at the beginning of the power stroke to the gas temperature at the end of the power stroke. A greater temperature ratio is obtained in the case of the diesel engine than for the gasoline engine. This is one of the reasons that the diesel engine can operate more efficiently than the gasoline engine.

Based on the foregoing theoretical consideration, it appears that there would be an advantage to the construction of a gasoline engine with a higher, or elevated, expansion ratio of the power stroke without a corresponding increase in the compression ratio of the compression stroke. By maintaining the relatively low value of the compression ratio in the compression stroke, the temperature of the cylinder gases would be maintained at a sufficiently low value so as to avoid premature ignition, as in present-day gasoline engines, while greater efficiency would be obtained as in present-day diesel engines. A further advantage of such an engine would be the avoidance of needless excess compression during the compression stroke, a matter which can be appreciated by one attempting to start an engine by hand.

Such a construction of an elevated expansion-ratio engine would be advantageous for the form of the internal combustion engine, generally used for powering automobiles, that operates in accordance with the Otto cycle, as well as other "mixed " cycle four stroke-repeating internal combustion engines. Such a construction of an elevated expansion-ratio engine would be advantageous also for a diesel engine wherein an expansion ratio in the power stroke of 20:1, by way of example, could be obtained for still greater efficiency while the compression ratio of the compression stroke would be maintained at 15:1. However, attempts to build such an engine have not met with commercial success.

SUMMARY OF THE INVENTION

The foregoing need for construction of an engine embodying an elevated expansion ratio is met, and other advantages are provided by an engine, constructed in accordance with the invention, wherein a third manifold, to be referred to as a return manifold, connects with a return port in each of the cylinders to remove a portion of the gases present in each of the cylinders during their respective compression strokes for reinsertion into a stream of air-fuel mixture provided by the carburetor or fuel-injection assembly. The cylinder head of each of the engine cylinders is provided with three ports, namely, an intake port with an associated intake valve, an exhaust port with an associated exhaust valve, and a return port with an associated return valve. An intake manifold of the engine connects via the intake ports and the intake valves with respective ones of the engine cylinders, an exhaust manifold of the engine connects via the exhaust ports and the exhaust valves with respective ones of the engine cylinders, and the return manifold connects via the return ports and the return valves with respective ones of the engine cylinders.

An engine with three ports and an associated three valves per cylinder head plus three manifolds connecting with respective ones of the ports is disclosed in U.S. Pat. No. of Date et al, 3,878,826, issued Apr. 22, 1975 (hereinafter referred to as "Date"). In the Date patent, the third manifold is connected between a carburetor and the cylinders to serve as an auxiliary intake manifold while, in the present invention, the third (return) manifold connects between the carburetor, or fuel injection assembly, and the cylinders to extract a portion of the gases (air-fuel mix) present in the cylinders during their respective compression strokes to be returned to the carburetor, or the fuel injection assembly. In the case of the present invention applied to a diesel engine, a portion of the air present in the respective cylinders during their compression strokes is returned by the third manifold to the source of the compressed air.

The return manifold comprises a relatively large central chamber with a set of arms extending from the central chamber to the return ports in respective ones of the cylinders. An exit passage of the central chamber communicates returned air-fuel mix to a location at the carburetor or fuel injection assembly, in the case of the gasoline engine, at which location the returning air-fuel mix combines with the air-fuel mix provided by the carburetor or fuel injection assembly, this location being ahead of the entrance to the intake manifold. In the case of a diesel engine, the exit passage of the central chamber communicates air to a location at the inlet to the source of compressed air. In accordance with a further feature of the present invention, the engine includes also a set of discharge valves located at the in board ends of the manifold arms adjacent to the central chamber of the return manifold. For each arm of the return manifold, the return valve (located at a cylinder head) serves to close off an outboard end of the manifold arm, and the discharge valve serves to close off the inboard end of the manifold arm. Thereby, each arm of the return manifold, in cooperation with its associated return valve and discharge valve, can serve as a holding tank for returned air-fuel mix (in the case of the gasoline engine) or returned air (in the case of the diesel engine).

The operation of the return valves is synchronized with the operation of the intake valves. Such synchronization can be accomplished by driving the return valve of an individual one of the cylinders by an additional cam on a camshaft which operates either one or both of the intake and exhaust valves of the cylinder, or by use of a further camshaft. The return valve is open during a portion of the compression stroke of its cylinder. During an open state of the return valve, the corresponding discharge valve is closed, and the interior space of the cylinder connects via the return port to the interior space of the corresponding holding tank. This effectively enlarges the interior size of the cylinder during the portion of the compression stroke when the return valve is open. The volume of the holding tank is essentially equal to the volume of the cylinder at the point in time wherein the piston has moved approximately half way along the compression stroke. Therefore, at this point in time, half of the charge of the cylinder, namely the air fuel mix (of the gasoline engine) or the air (of the diesel engine) is located in the cylinder and the other half of the charge is located in the holding tank.

Thereupon, the return valve is closed, and the compression stroke continues with only half of the charge being present in the cylinder. The withdrawn charge is held within the holding tank until a later moment when it can be discharged into the central chamber of the return manifold. The discharging is accomplished by an opening of the discharge valve. In the practice of the invention, the discharging of the returned charges of the various holding tanks is accomplished in a manner which encourages a relatively smooth flow of the returned charges from the return manifold into the inlet to the carburetor or the fuel-injection assembly. The smooth flow of the returned air or air-fuel mix ensures that subsequent metering of the air or air-fuel mix can be accomplished in a normal manner without disruption by the process of extracting air or air-fuel mix from the cylinders.

The invention can be practiced without major modifications of the standard engine. Thus, with respect to increasing the expansion ratio during the power stroke of the engine, this can be accomplished by using a taller piston while retaining the interior length of the cylinder, so that the expansion ratio is increased from the value of approximately 8:1 to a value of approximately 15:1.

In accordance with a well-known relationship in the physics of gases, the product of the pressure of a gas times the volume of the container of the gas is proportional to the product of the temperature of the gas times the number of moles of the gas in the container. In the above noted practice of the invention, wherein half of the charge of the cylinder is removed during the compression stroke, and wherein the length of the piston has been increased for an increased expansion ratio, the pressure and temperature of the gas at the end of the compression stroke is reduced to lower values than that which would be present if no modification had been made to the length of the piston for identically sized engines in identical vehicles traveling on the same road at the same speed. Thereby, the invention enables the engine to operate with the high-efficiency associated with the higher expansion ratio while retaining the pressure, the temperature and the ignition characteristics of the charge in the cylinder to be substantially the same as that of an unmodified engine.

In modern engines, a computer is employed for regulating the air-fuel ratio as well as the total amount of air drawn into the cylinders based on such factors as the mass density and temperature of environmental air, engine speed, requested vehicular speed, and the concentration of oxygen in the exhaust gases. Since this invention retains the temperatures and pressures of the air or air-fuel mix in the compression stroke, the vehicular computer can control the quantities of air and fuel admitted to the engine in a fashion similar to that of an unmodified engine with minimal changes in programming.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
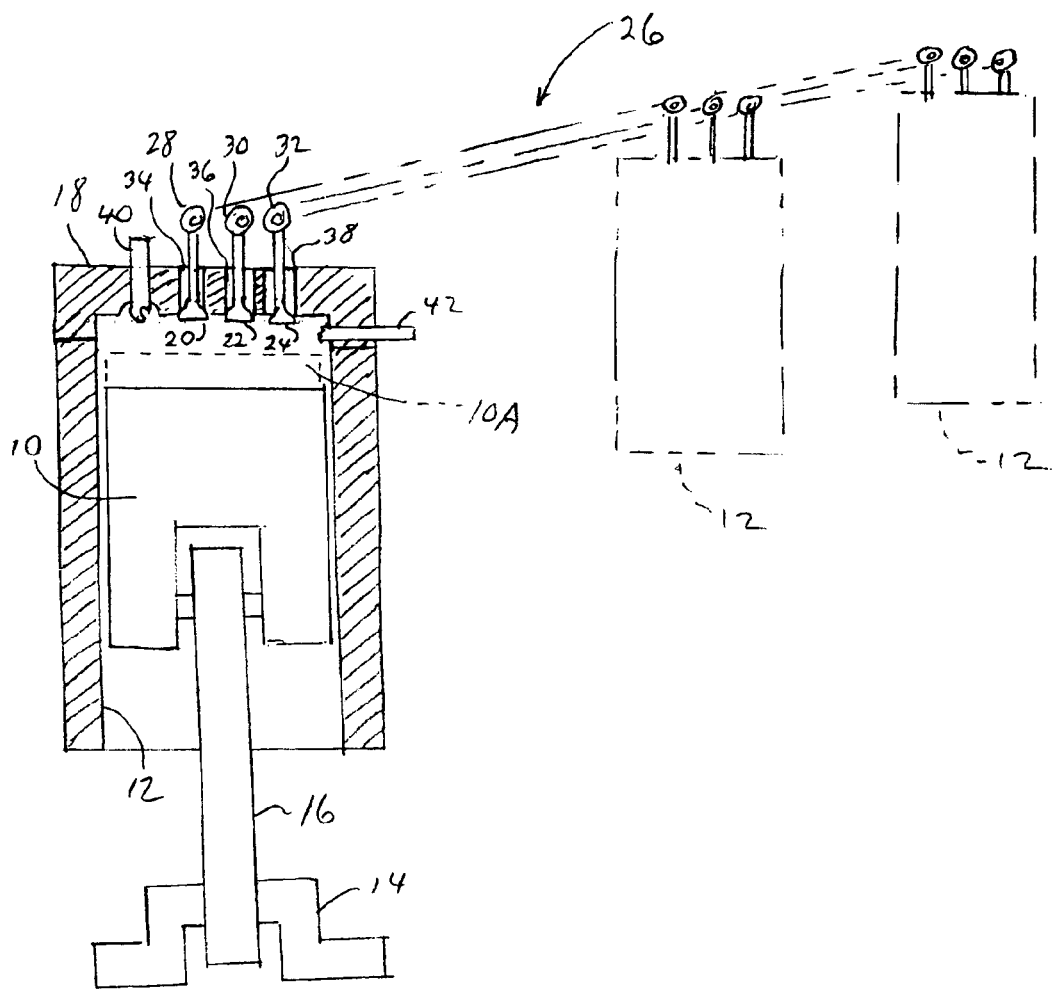
FIG. 1 shows a stylized view of an internal combustion engine constructed in accordance with the invention.

FIG. 1 shows a diagrammatic view of a piston 10 within its cylinder 12. The piston 10 is driven by a crankshaft 14 and connecting rod 16 with reciprocating motion, wherein the motion of the piston 10 is characterized by a repeating sequence of four strokes, as described above. During the induction stroke and the power (or expansion) stroke, the distance between the piston 10 and a head 18 of the cylinder 12 increases to provide for an increase in the volume of cylinder available for containing gases within the cylinder. During the compression and the exhaust strokes, the distance between the piston 10 and the head 18 decreases to provide for a decrease in the volume of the cylinder available for the containment of gases within the cylinder. The invention provides for the changing of the geometry of the piston 10 relative to the cylinder 12 by increasing the length of the piston 10 to provide for a taller piston 10A as indicated in dashed line. Typically, in the construction of the cylinder head 18, the interior of the head 18 may be provided with a complex shape to enhance combustion within the cylinder 12; however, for an understanding of the present invention, the interior of the cylinder head 18 may be represented by the more simple shape of a right circular cylinder as shown in FIG. 1.

By way of example in the construction of the piston 10, 10A within its cylinder 12, in the ease of a gasoline engine operating with the four-stroke process, when the piston in the cylinder is at top dead center, there is 1 cm (centimeter) between piston-top and the head. If the length of a stroke is 7 cm, then bottom dead center is 8 cm from piston to head, this resulting in a compression stroke with 8:1 compression ratio and a power stroke expansion ratio of 8:1. The diesel engine four-stroke cycle differs from this pattern only by having a higher compression ratio and a correspondingly higher expansion ratio.

Now, continuing with this example to show the preferred embodiment of the invention, the piston 10A is made to be 0.5 cm taller. This changes the geometric ratios from a ratio of (8 cm to 1 cm), with corresponding compression and expansion ratios of 8:1, to a ratio of (7.5 cm to 0.5 cm) with a corresponding expansion ratio of 15:1 in the power stroke. The invention prevents the compression ratio of the compression stroke from rising above 8:1 by use of the return valve (described above and to be described hereinafter) which releases some of the gases (or vapor) in the cylinder during the beginning of the compression stroke. The result is that the compression stroke retains its compression ratio of approximately 8:1 (assuming that the return valve closes when the piston position is half way through the compression stroke) while the expansion stroke has the aforementioned expansion ratio of 15:1. By this usage of different ratios of the compression and the expansion strokes, the invention may be said to change the engine's operational aspect ratio of expansion ratio to compression ratio from today's regular industrial standard of 1:1 to an elevated level of about 2:1 in gasoline engines.

In the case of the diesel engine, wherein the elevated temperature produced by the relatively high compression of the air is responsible for ignition of the fuel, the improvement in the aspect ratio in diesel engines may be less that 2:1. However in the cases of both the gasoline engine and the diesel engine, if the invention results in an "elevated" aspect ratio of greater than 1:1.

FIG. 1 also shows an intake valve 20, an exhaust valve 22 and a return valve 24 located in the cylinder head 18, these three valves being present in both the gasoline and the diesel forms of an engine 26 constructed with the piston 10A and the cylinder 12. Three camshafts 28, 30 and 32 are provided for operation of the valves 22, 24 and 26, respectively. It is understood that the three camshafts are provided by way of example, and that, by way of further example, a single camshaft with two cams thereon may be employed for operation of two of the foregoing valves, or possibly a single camshaft with three cams thereon may be employed for operation of all three of the valves. The intake valve 20 is operative to close and to open an intake port 34 of the head 18. The exhaust valve 22 is operative to close and to open an exhaust port 36 of the head 18. The return valve 24 is operative to close and to open a return port 38 of the head 18. Also shown in FIG. 1 is a spark plug 40 for ignition of gases in the cylinder 12 in the case of the gasoline engine and, as an alternative form of construction, FIG. 1 also shows a fuel injector 42 for injecting fuel into the heated air at the beginning of the power stroke for the case of the diesel engine. Additional cylinders 12 of the engine 26 are indicated in phantom.

Figure 2:
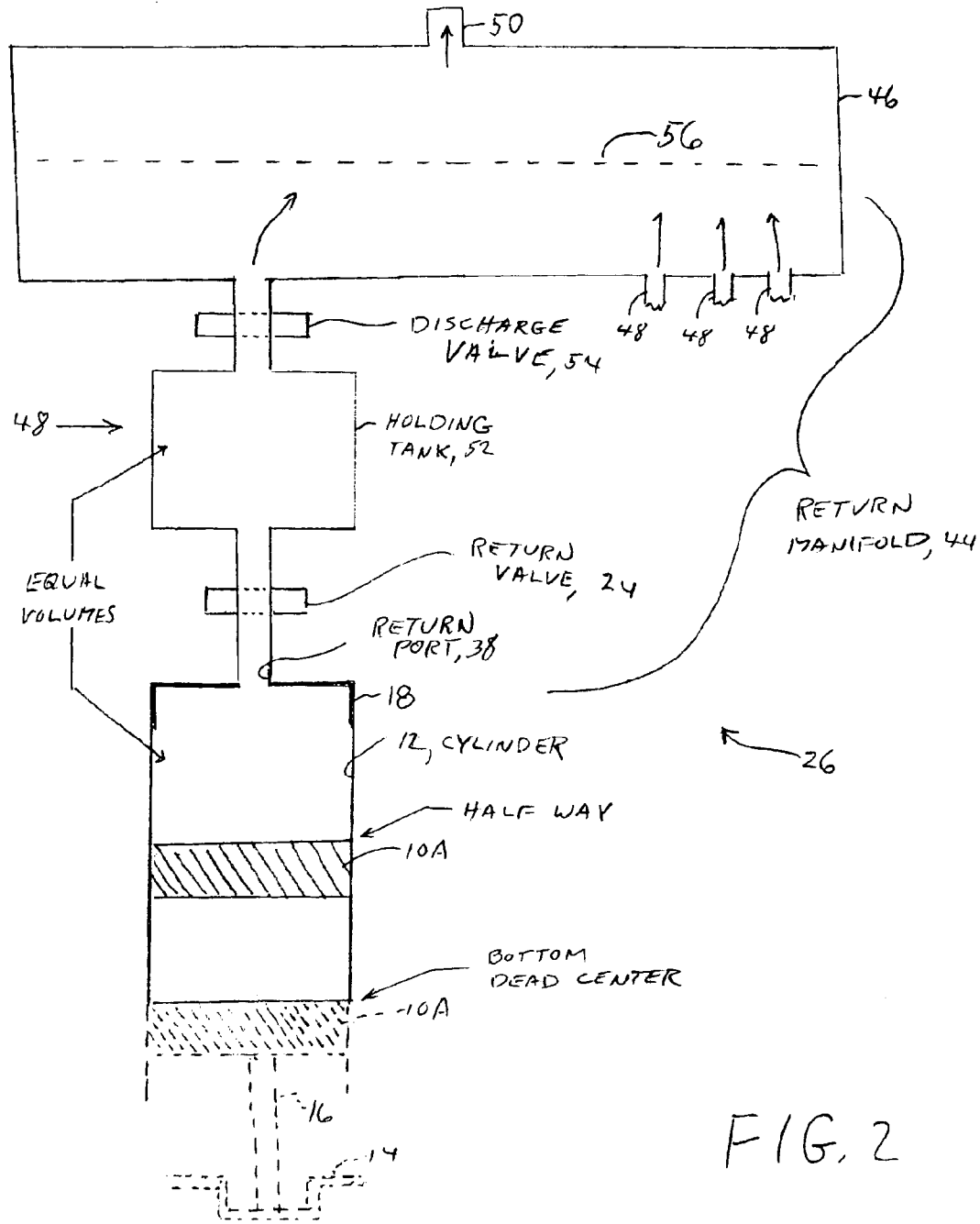
FIG. 2 shows diagrammatically details in the construction of a return manifold connected to a cylinder of the engine of FIG. 1.

FIG. 2 shows a simplified view of the cylinder 12 and its connection with a return manifold 44. In the cylinder 12, the piston 10A is being driven during a compression stroke from its position at bottom dead center towards the cylinder head 18, and is shown in FIG. 2 at the halfway point. The return manifold 44 comprises a central chamber 46 with a plurality of arms 48 extending from the central chamber 46 to respective ones of the cylinders 12 of the engine 26. An outlet passage 50 is provided on the central chamber 46 for directing return gases from the return manifold 44, in the case of the gasoline engine, to the location at the carburetor or fuel injection assembly (not shown in FIG. 2) in which the return gases join the stream of the air-fuel mix heading toward an inlet of the intake manifold (not shown in FIG. 2). Arrows show the direction of gas flow within the central chamber 46.

Each of the arms 48 has the same construction, which construction in shown for one of the arms 48 in the figure. The arm 48 has sufficient internal volume to serve as a holding tank 52 for a quantity of the cylinder gases passed from the cylinder 12 into the arm 48 during a portion of the compression stroke of the piston 10A. One end of the holding tank 52, at the outboard end of the arm 48, connects via the return valve 24 and the return port 38 to the cylinder 12. The other end of the holding tank 52, at the inboard end of the arm 48, connects via a discharge valve 54 to the central chamber 46.

In the operation of the arm 48, prior to inception of the compression stroke, the discharge valve 54 closes to prevent any flow of vapor or gases between the holding tank 52 and the central chamber 46. The return valve 24 is opened, at the commencement of the compression stroke, to provide for communication between the interior space of the cylinder 12 and the interior space of the holding tank 52. Then, during the compression stroke, as the piston 10A advances towards the head 18, the piston 10A pushes gases from the cylinder 12 via the return port 38 into the holding tank 52. Since these gases cannot escape from the holding tank 52, because of the closure of the discharge valve 54, pressure of the gases builds up in both the interior space of the cylinder 12 and in the interior space of the holding tank 52.

In a preferred embodiment of the invention, the interior volume of the holding tank 52 is equal to one-half of the interior volume of the cylinder 12 when the piston 10A is at bottom dead center. When the piston advances to a position half way toward the cylinder head 18, the position shown in FIG. 2, the volume of the cylinder located between the piston and the head is equal to the volume of the holding tank 52. Therefore, for the situation depicted in FIG. 2, half of the gases originally present in the cylinder 12 has been moved to the holding tank 52. In the operation of the compression stroke, as the piston 10A passes the halfway point, the return valve 24 closes to prevent further egress of the gases from the cylinder 12. It is recalled that the piston 10A of the modified cylinder is taller than the piston 10 (as described above in FIG. 1) of the unmodified cylinder. The removal of the foregoing quantity of engine gases from the cylinder 12 into the holding tank 52 compensates for the greater height of the piston 10A so as to produce, at the end of the compression stroke, a pressure and temperature in the cylinder gases which is substantially the same as that which is found in the operation of the unmodified cylinder.

By way of review of the preferred embodiment of the invention, it is noted that the modification of the engine 26 provided in FIG. 1 considers the situation wherein the piston is at top dead center, and the piston height is raised sufficiently so as to half the cylinder space with the piston at top dead center. Reducing the volume of the compressed gas by a factor of two raises the pressure and temperature of the gas well above the values of pressure and temperature found in the unmodified engine. The removal of half of the engine gases by means of the holding tank 52, as described in FIG. 2, restores the values of pressure and temperature to those of the unmodified engine.

However, for alternative embodiments of the invention, it is recognized that one may wish to lower the pressure and temperature of the compression stroke in the modified engine (FIG. 1) to values below that found in the unmodified engine so as to be able, by way of example, to operate the modified engine with a lower octane fuel. This can be accomplished, in accordance with the invention, by employing the holding tank 52 to remove more than 50 percent of the engine gases, for example, to remove 60 percent of the engine gases. Removal of the 60 percent of the engine gases is accomplished by enlarging the holding tank 52 from the size disclosed with reference to FIG. 2. Alternatively, if the engine had been operating on low octane fuel, and it is desired to operate the modified engine on higher octane fuel, then one would reduce the size of the holding tank 52 to remove less than 50 percent of the engine gases, possibly to remove only 45 percent of the engine gases.

It is also possible to alter the amount of the gases removed by the holding tank 52 by closing the return valve 24 earlier during the compression stroke, this reducing the amount of gases transferred from the cylinder 12 into the holding tank 52. Alternatively, one may delay the closing of the return valve 24 during the compression stroke, this increasing the amount of gases transferred from the cylinder 12 into the holding tank 52. In each of the foregoing cases, it is apparent that the invention has made it possible to transfer a precisely determined fraction of the cylinder gases into the holding tank 52, thereby to compensate for changes in the height of the piston as well as to accomplish further changes compensating for fuel octane.

By way of further example in the case of a diesel engine, wherein it is desired to alter the expansion ratio of the power stroke from a value of 16:1 to the value of 20:1, this can be accomplished with a relatively small change in the piston height, as compared to the changes disclosed above the reference to FIG. 1. It is recalled that, in the case of the embodiment of FIG. 1, the expansion ratio of the power stroke was changed from a value of 8:1 to a value of 15:1 by modification of the engine, while in the case of the present example of the diesel engine, a relatively small change in the expansion ratio of the power stroke is provided, namely, from the aforementioned value of 16:1 to the value of 20:1. In order to restore the values of temperature and pressure that were originally present in the compression stroke prior to the modification of the height of the piston, the holding tank 52 would be employed to remove a portion of the cylinder gases. However, the amount of the cylinder gases to be removed in this example of the diesel engine is smaller than that disclosed above with reference to the embodiment of FIG. 1. This is accomplished most readily by employing a holding tank 52 of smaller size, relative to the size of the cylinder, than that disclosed in the description of FIG. 2.

In accordance with a further feature of the invention, that central chamber 46 of the return manifold 44 is provided with a mesh 56 extending across the chamber 46 at a location between the outlet passage 50 and the set of arms 48. By way of example, the mesh 56 may divide the internal space of the chamber 46 into two equal portions. The mesh 56, which may be constructed as a wire screen with apertures therein, functions as an acoustic baffle, as does a corresponding structure in a muffler, to reduce pulsations in the speed and pressure of gases applied to the central chamber 46 by respective ones of the arms 48. In terms of an electrical-circuit analogy to the operation of the return manifold 44, gas, escaping from a holding tank 52 by its corresponding discharge valve 54 into the central chamber 46, experiences a certain amount of resistance to the flow of the gas through the discharge valve 54, depending on the interior dimensions of the discharge valve 54.

The central chamber 46 has a substantially larger interior volume than does any one of the holding tanks 52. The volume of the central chamber 46 is sufficiently large to store the quantities of gas expelled from a plurality of the holding tanks 52, just as a capacitor of an electrical low-pass filter is able to store the charge from a pulsating current to provide a relatively in a value of voltage. The mesh 56, by introduction of resistance to the flow of gases across the chamber 46, may be viewed, in terms of the analogous electrical circuit, as dividing the chamber 46 into two sections, each of which may be regarded as a capacitor of the foregoing low-pass filter, with the two capacitors coupled via an electrical resistor. The outlet passage 50 also introduces an amount of resistance to the flow of the return gas, depending on the interior dimensions of the outlet passage 50. Accordingly, the return manifold 44 is operative to reduce pulsations of returned gases from the respective cylinders 12 to a steady stream of gas, ready to be combined with the air-fuel mixture of a carburetor or fuel injection assembly of the engine, in the case of the gasoline engine, or with air from the source of compressed air, in the case of the diesel engine.

As described above with reference to FIG. 1, the camshafts 28, 30 and 32 provide synchronization among the valves of the respective cylinders 12 of the engine 26. As is well-known in the construction of engines, the camshafts are driven by mechanical timing apparatus connecting with the crankshaft 14. It is understood that, in certain modern engines operated by computer, it may be possible to alter the timing between respective ones of the valves in a cylinder 12. When such altering of the timing is provided, it is based on such factors as engine speed and the request for greater engine torque by a person operating the vehicle, as when the driver steps on the accelerator pedal. With respect to the operation of the discharge valve 54, a mechanical linkage with a cam on one of the camshafts 28, 30 or 32 may be employed to drive the valve 54, or a separate camshaft (not shown) may be employed to drive the valve 54, or a motorized valve (the discharge valve 54 in combination with an electric motor drive) driven by the engine computer may be employed to drive the valve 54. Thereby, the timing of the operation of the discharge valve 54 in each of the respective ones of the manifold arms 48 can be set to compensate for pulsations in the magnitude of the vacuum found in the intake manifold (to be described hereinafter) during operation of the engine 26. Thus, in accordance with a further feature of the invention, the timing of the operation of the discharge valve 54 may be employed in conjunction with the aforementioned pulsationsfiltering operation of the return manifold 44 to ensure a steady stream of the flow of the intake fuel-air mixture (gasoline engine) or the intake air (diesel engine) to the intake manifold.

Figure 3:
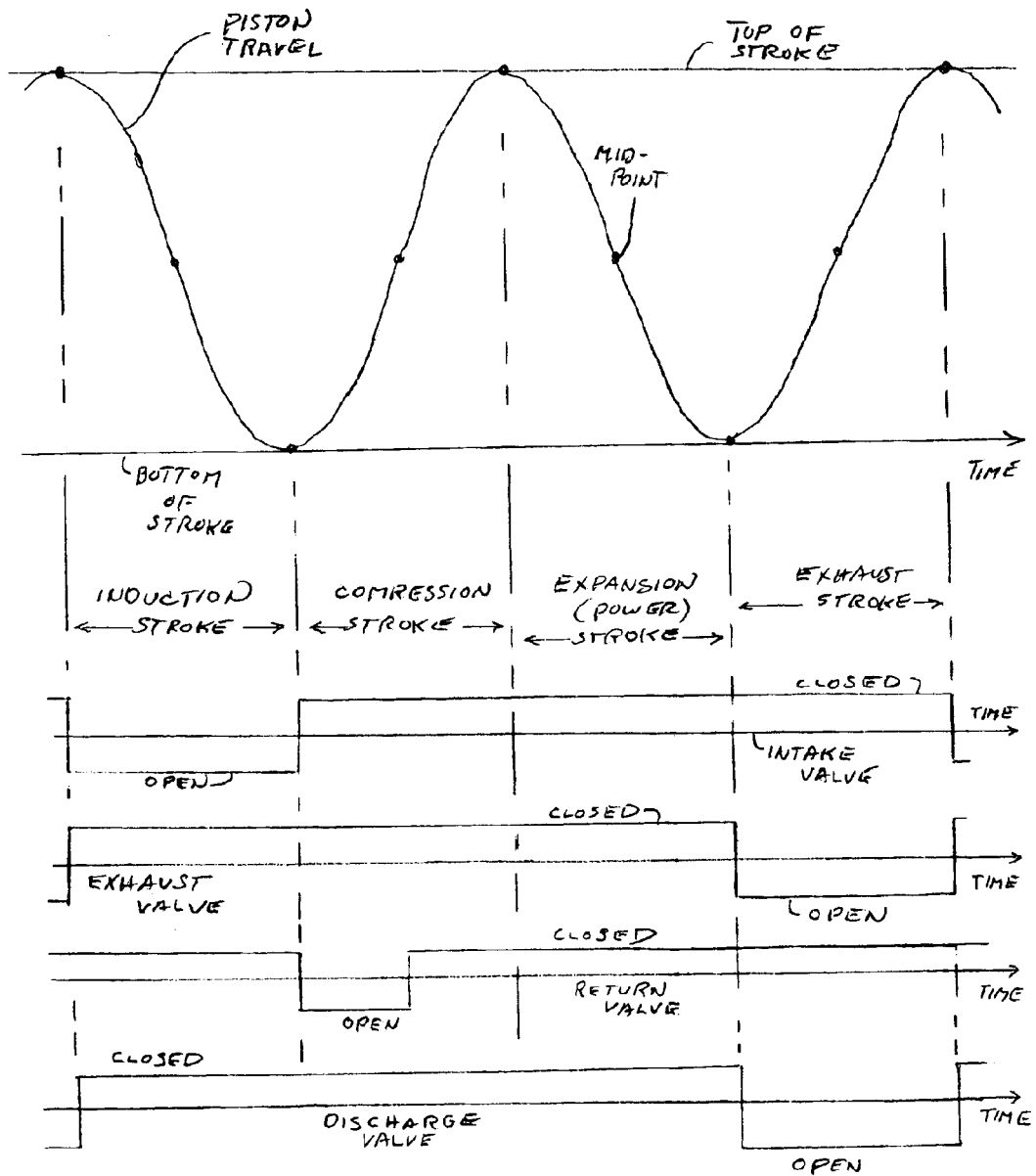
FIG. 3 is a timing diagram showing operation of valves and a piston associated with a cylinder of the engine.

FIG. 3 presents a timing diagram showing the various strokes during the piston travel with the reciprocating motion in the cylinder. Also shown are the open and close positions of the valves with reference to the piston travel. Horizontal axes represent the time. At the top of the diagram, the piston travel is shown as a sinusoidal movement between the top of the stroke and the bottom of the stroke, identified in the figure. The midpoint of a stroke is also identified. The strokes are identified as the induction stroke, wherein the piston travels from the top dead center position, adjacent the cylinder head, to the bottom dead center position, the compression stroke wherein the piston travels from the bottom dead center to the top dead center positions, this being followed by the expansion (or power) stroke wherein the piston travels from the top dead center position to the bottom dead center position, and the exhaust stroke wherein the piston travels from the bottom dead center position to the top dead center position. The intake valve is shown open during the induction stroke and closed during the other three strokes. The exhaust valve is shown open during the exhaust stroke and closed during the other three strokes. The return valve is shown open during the first half of the compression stroke, and closed for the second half of the compression stroke as well as during the other three strokes. The discharge valve is shown open during the exhaust stroke and closed during the other three strokes. The open status of the discharge valve is presented by way of example for convenience in operating the discharge valve from the same cam as is used in operation of the exhaust valve. It is understood that, in the event that a separate timing mechanisms employed for operation of the discharge valve, the discharge valve may be opened, by way of example, during a different interval of time, such as an open interval beginning at approximately the midpoint of the expansion stroke and terminating at approximately the midpoint or at the end of the exhaust stroke.

Figure 4:
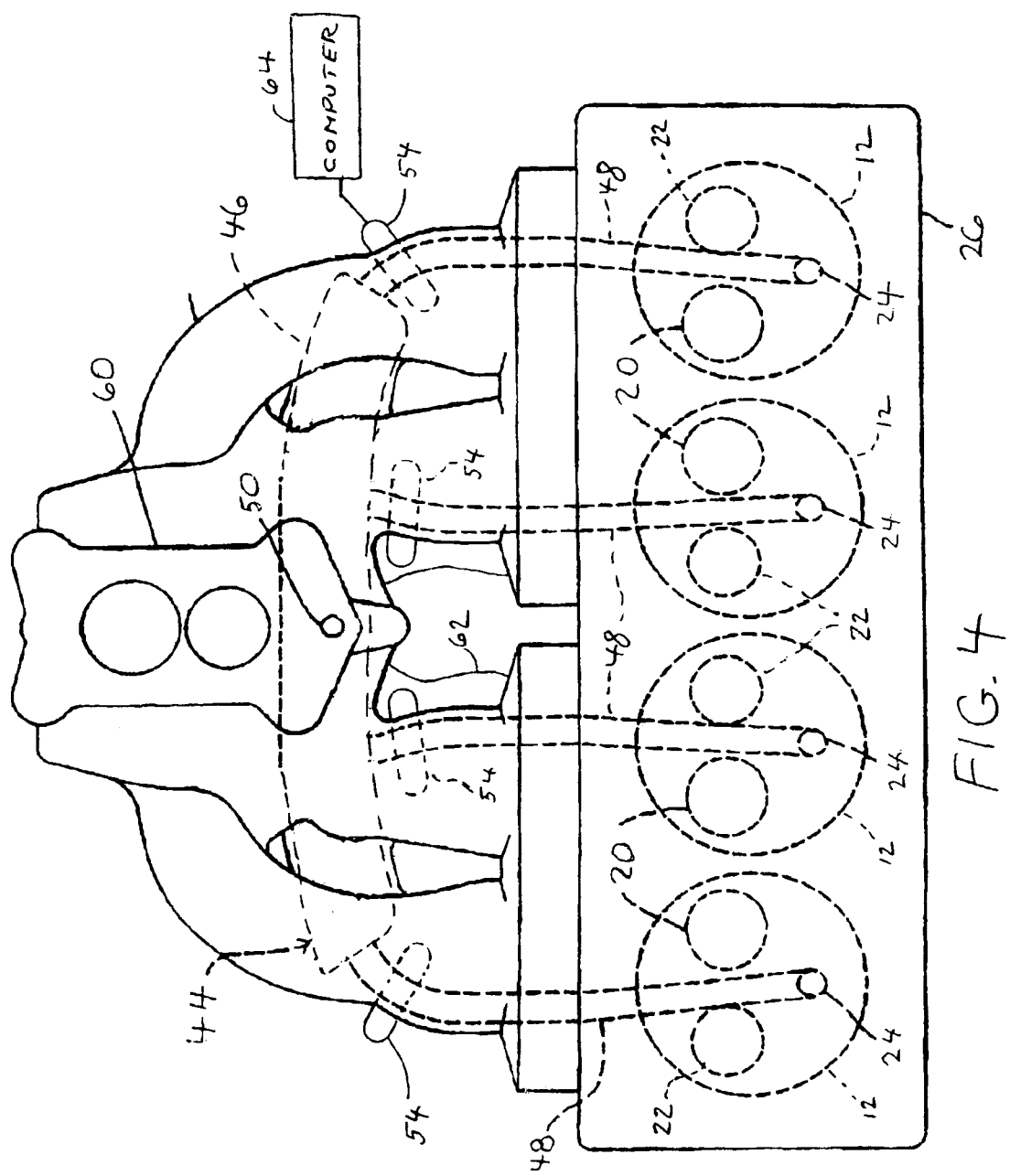
FIG. 4 is a diagrammatic plan view of an assembly of manifolds of the engine.

FIG. 4 presents a diagrammatic view of the engine 26, and shows interconnection of an intake manifold 58 between intake valves 20 of the respective cylinders 12 of the engine 26 and a housing 60 which may contain either a carburetor or a fuel injector assembly. The engine 26 further comprises an exhaust manifold 62 connecting with exhaust valves 22 of the respective cylinders 12. Also shown in FIG. 4 is the return manifold 44 of the engine 26, the return manifold 44 connecting between the housing 60 of the carburetor or the fuel-injector assembly and the return valves 24 of the respective cylinders 12. The arms 48 of the return manifold 44 connect via the discharge valves 54 to the central chamber 46 of the return manifold 44. As described above, synchronization of the discharge valves 54 with the operation of other components of the engine 26 may be accomplished by either a mechanical connection, as by an additional camshaft, or by an electrical connection to a computer 64 which operates to control various functions of the engine 26.

Figure 5:
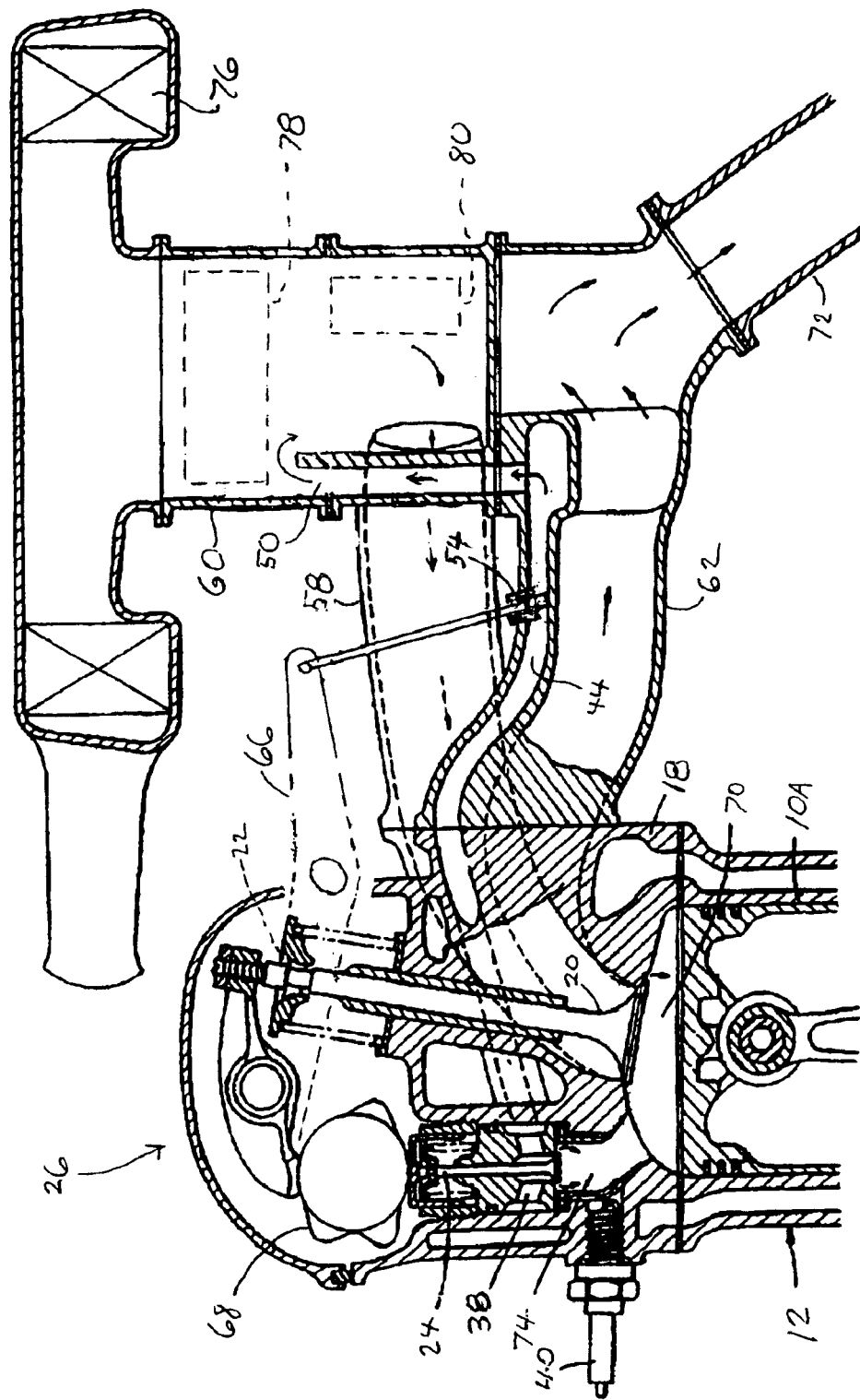
FIG. 5 is a diagrammatic sectional elevation view of a cylinder and connecting manifolds of the engine.

FIG. 5 shows a diagrammatic view of the engine 26 wherein a part of the engine construction is similar to that of the engine of the Date patent, the figure showing further, in schematic form, a modification of the head 18 to accommodate an additional pivoting valve-lifter rocker-arm 66 operated by a camshaft 68 for opening and closing the discharge valve 54. In the engine 26, a cylinder 12 is shown with its piston 10A, the piston 10A defining with the head 18 a combustion chamber 70. In the view of FIG. 5, the exhaust valve 22 is positioned behind the intake valve 20 and, accordingly, is not visible, but is shown in FIG. 4. The intake manifold 58 connects between the housing 60 and the intake valve 20, and the exhaust manifold 62 connects between an exhaust pipe 72, at the base of the housing 60, and the exhaust valve 22. An auxiliary chamber 74 is formed within the head 18 and branches off from the combustion chamber 70 to receive the spark plug 40, and to communicate with the return port 38 and the return valve 24. The return port 38 is at the junction of the return manifold 44 and the auxiliary chamber 74. The configuration of the housing 60 provides for support of an air cleaner 76, provides for a location at 78, indicated in phantom, for the venturi of a carburetor and, by way of alternative embodiment, provides for a location at 80, indicated in phantom, for a fuel injection assembly. The outlet passage 50 of the return manifold 44 extends along the interior of the housing 60 to combine a stream of the return air-fuel mix with an air fuel mixture provided by the carburetor or by the fuel-injection assembly. The combined streams of the air fuel mixture then enter into the intake manifold 58 to feed the combustion within the cylinder 12. Thereby, an engine constructed in accordance with the invention is able to recirculate the portion of the air-fuel mixture, withdrawn from the cylinder via the return manifold, back to the cylinder via the intake manifold.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An internal combustion engine comprising:
   a cylinder and a piston movable with reciprocating motion within the cylinder, the piston motion providing a succession of four strokes including an induction stroke, a compression stroke, a power stroke and an exhaust stroke, wherein the engine is a gasoline engine or a diesel engine;

wherein the compression stroke serves to compress a quantity of gas within the cylinder in preparation for the power stroke, the compression-stroke gas being a mixture of air and fuel in the gasoline engine, or air without fuel in the diesel engine, the compression stroke providing a reduction in volume of the gas characterized by a compression ratio;

the power stroke provides for an expansion in volume of a quantity of gas within the cylinder, characterized by an expansion ratio, the gas in the power stroke being a mixture of air, fuel, and products of combustion;

the engine further comprises reducing means for reducing the compression ratio to a value less than the expansion ratio;

the reducing means comprises a return manifold for coupling a portion of the quantity of the gas from the cylinder during the compression stroke to a source of the compression-stroke gas; and a head of the cylinder includes a return port communicating with an arm of the return manifold, and a return valve operative for closing and opening the return port, and wherein the return manifold includes a central chamber having a volume larger than a volume of the arm, the engine further comprising a discharge valve located in an end portion of the arm adjacent the central chamber of the return manifold, wherein the discharge valve is operative to open and to close a passage between the arm and the central chamber of the return manifold, the arm of the return manifold defining a holding tank between the return valve and the discharge valve.

2. An engine according to claim 1 wherein said cylinder is a first cylinder of the engine, the engine comprising a plurality of cylinders including said first cylinder, said return manifold having a plurality of arms extending from said central chamber and communicating with respective ones of said plurality of cylinders for extracting gas from respective ones of said plurality of cylinders during respective compression strokes in individual ones of said plurality of cylinders.

3. An engine according to claim 2 further comprising an intake manifold coupled to individual ones of said plurality of cylinders via intake ports and corresponding intake valves in heads of said respective cylinders, and an exhaust manifold coupled to individual ones of said plurality of cylinders via exhaust ports and corresponding exhaust valves in the heads of the respective cylinders; wherein individual ones of the arms of the return manifold are coupled to individual ones of said plurality of cylinders via return ports and corresponding return valves in the heads of the respective cylinders, and end portions of individual ones of the arms adjacent to the central chamber of the return manifold are provided with discharge valves; and wherein, in each of the arms of the return manifold, the arm defines a holding tank between the return valve and the discharge valve.

4. An engine according to claim 3 wherein operation of the return valves of the engine is synchronized with operation of the intake valves of the engine, the synchronization of operation of each of the return valves enabling each of the return valves to be open during a portion of the compression stroke in each of the respective cylinders.

5. An engine according to claim 4 further comprising drive means for driving respective ones of the discharge valves for discharging return gas from a holding tank in each of the respective arms, the drive means maintaining each of the discharge valves in a closed state during an open state of an intake valve of respective ones of the cylinders.

6. An engine according to claim 5 wherein the drive means opens the discharge valves in staggered fashion to smooth a flow of discharged gas exiting the return manifold.

7. An engine according to claim 6 wherein the return manifold includes a flow impeding structure within the central chamber of the return manifold for impeding the flow of return gas through the return manifold.

8. An engine according to claim 7 wherein the flow impeding structure comprises a mesh.

9. An engine according to claim 4 wherein said synchronization is provided by at least one camshaft of said engine.

10. An engine according to claim 4 wherein, in any one of the cylinders, the return valve opens at substantially the beginning of the compression stroke and closes in a middle region of the compression stroke; wherein, in the middle region of the compression stroke, the piston has reduced the volume of gases within the cylinder to approximately one-half of the volume of the gases at the beginning of the compression stoke; and wherein, prior to the closure of the return valve, approximately half of the gases within the cylinder has entered into the holding tank that communicates via tube return valve to said cylinder.

* * * * *